(No Model.)   2 Sheets—Sheet 1.
T. A. EDISON.
ELECTRICAL METER.
No. 304,082.   Fig 1.   Patented Aug. 26, 1884.
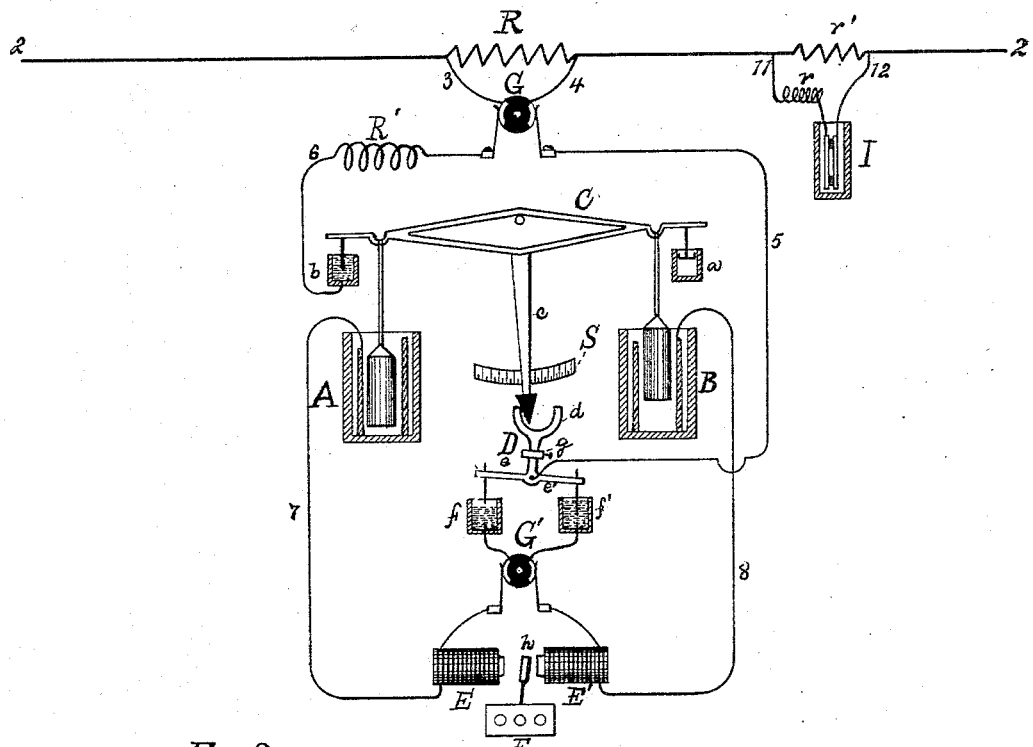
Fig. 2.
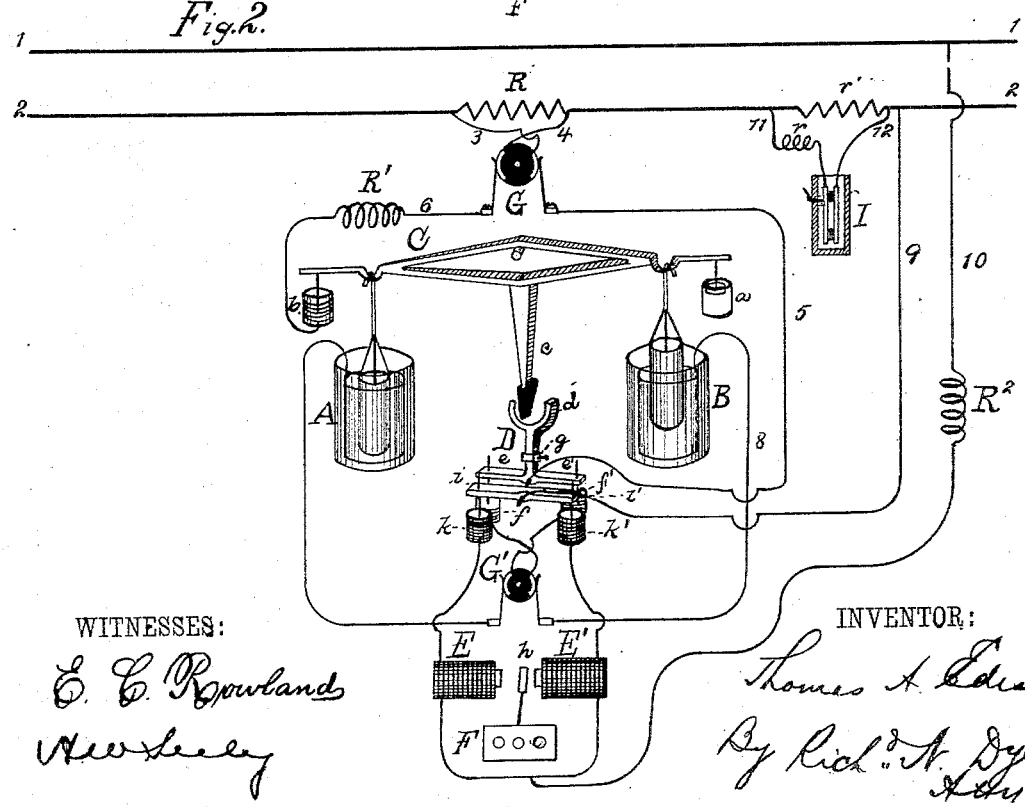
WITNESSES:
E. C. Rowland
Hew Seely
INVENTOR:
Thomas A. Edison,
By Rich'd N. Dyer
Atty.

(No Model.)　　　　　　　T. A. EDISON.　　　　2 Sheets—Sheet 2.
ELECTRICAL METER.
No. 304,082.　　　　　　　　　Patented Aug. 26, 1884.
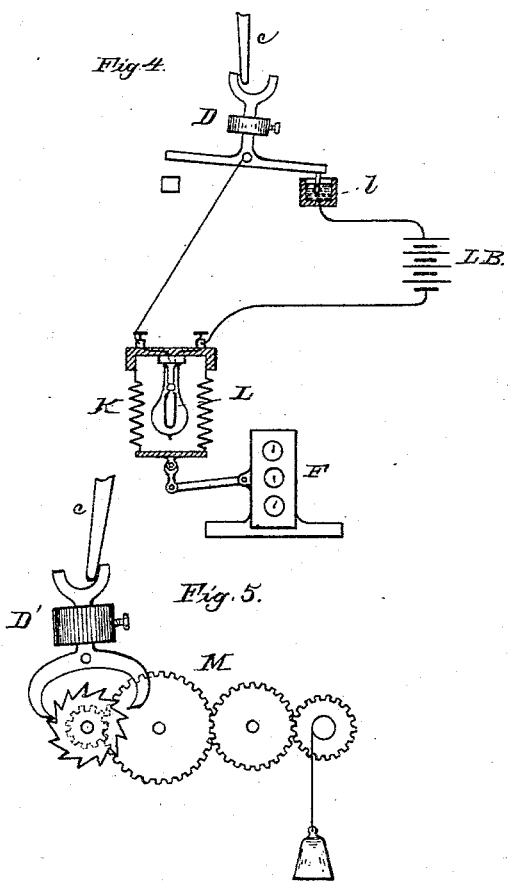

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

ELECTRICAL METER.

SPECIFICATION forming part of Letters Patent No. 304,082, dated August 26, 1884.

Application filed August 14, 1882. (No model.) Patented in England July 10, 1882, No. 3,271; in Germany November 8, 1882, No. 23,909; in Italy November 14, 1882, No. 14,757; in Belgium November 15, 1882, No. 59,396; in France November 22, 1882, No. 139,689, and in Spain April 23, 1883, No. 3,860.

*To all whom it may concern:*

Be it known that I, THOMAS A. EDISON, of Menlo Park, in the county of Middlesex and State of New Jersey, have invented a new and useful Improvement in Electrical Meters, (Case No. 454;) and I do hereby declare that the following is a full and exact description of the same, reference being had to the accompanying drawings, and to the letters of reference marked thereon.

The object of this invention is to produce an automatically-registering meter for measuring the electrical energy consumed in a circuit, which will be simple in construction and efficient in operation. This is accomplished by the use of two electrolytic cells, two of the electrodes (one of each cell) being suspended from the ends of a beam, which is supported centrally on a pivot. These cells are arranged in a shunt-circuit around resistance placed in the line of one of the main conductors of a house-circuit, and have connected with them a circuit making and breaking device operated by the beam, by which the current of the shunt always passes through the cell, having its electrode elevated or depressed, according to whether the meter is acting by depositing upon or stripping from the suspended electrodes. The deposit upon the elevated electrode increases its weight until it overbalances the depressed electrode at the other end of the beam, and the beam is tipped or metal is stripped from the depressed electrode until it becomes lighter than the elevated electrode, when the same movement takes place. The movement is utilized to break the circuit of the cell through which the current has been passing, and to complete the circuit of the other cell. The movement of the beam is also used to work a registering apparatus, either by making and breaking the circuits of electro-magnets or by a mechanical connection with the beam or a part moved by it. The electro-magnets (if used) may be in circuit with the cells or in other circuits. To register a partial movement of the beam, a scale may be provided, upon which will travel a finger attached to or worked by the beam. The beam will continue to tip back and forth, and its movements will be indicated by the register, the suspended electrodes acting as the cathodes of the cells, and receiving additional weight alternately, or acting as the anodes and being stripped alternately. At the end of each month or other fixed period the direction of the current through the cells and the connections of the circuit-controller will be reversed, and the suspended electrodes will become the anodes of the cells, if they have been acting as the cathodes during the previous month, or the cathodes if they have before acted as anodes. To effect the reversal of the current and the connections of the circuit-controller, a simple hand-reverser is used for such purpose, which will be mounted upon a common spindle, and will be worked simultaneously by the employé of the lighting company who makes note of the condition of the meter. To maintain electrical connection with the working-beam, such beam is provided with a rod at one end dipping in a cup of mercury, which keeps the parts in good electrical contact without producing friction. The circuit-controller worked by the beam makes and breaks the circuits of the cells by means of mercury-cups and points which are dipped into and raised out of the mercury, the movement thus requiring very little power. The working-beam has its movement retarded by means of a reciprocating dash-pot, so as to assure regularity and prevent the meter from being affected by jars. A compensating-resistance is placed in the circuit of the cells, so as to compensate for changes in resistance caused by variations in temperature, and a lamp or other heating resistance the circuit of which is closed by a thermostatic device is used with each meter to prevent the freezing of the solution of the cells. In connection with each automatic meter a simple electrolytic cell-meter may be used to keep the record intact if the automatic meter should become inoperative. For this extra cell, as well as the cells of the automatic meter, there are preferably used amalgamated-zinc electrodes placed in a solution of sulphate of zinc.

The foregoing will be better understood by reference to the drawings, in which Figure 1 is an elevation, partly diagrammatic, of the meter; Fig. 2, a perspective view, partly diagrammatic, with modified connections for the registering electro-magnets; Fig. 3, a view of detached parts, showing means for operating the register mechanically from the working-beam; and Figs. 4 and 5, views similar to Fig. 3 of other modifications.

A and B are two electrolytic cells, each composed, preferably, of two cylindrical electrodes of amalgamated zinc placed in a solution of sulphate of zinc. One electrode of each cell is suspended from the end of a beam, C, which is pivoted centrally. At one end this beam is connected with the reciprocating plunger of a dash-pot, $a$, while at its other end it has a rod projecting into a mercury-cup, $b$, and kept constantly immersed in the mercury of the cup. The beam C has an arm or finger, $c$, projecting therefrom, which plays in the U-shaped yoke $d$ of a pivoted circuit-controller, D, the parts being insulated to prevent short-circuiting the cells. This circuit-controller has three arms—a vertical arm, which has the yoke $d$ at its end, and two horizontal arms, $e$ $e'$, provided with points dipping in mercury-cups $f f'$. The circuit-controller is pivoted at the junction of the arms, and its vertical arm has an adjustable weight, $g$, to throw the circuit-controller when it is carried over the center by the arm $c$ of the beam C.

E E' are two electro-magnets acting upon an intermediate armature-lever, $h$, the movement of which works the register F.

G G' are simple hand-operated current-reversers, which are shown separated for clearness of illustration, but which, in practice, are mounted on a common spindle and moved simultaneously.

1 2 are the main conductors of a house-circuit, having placed therein a resistance, R, around which is the shunt-circuit through the meter. This shunt has wires 3 4 running from opposite sides of the resistance to the current-reverser G. From one spring of the current-reverser a wire, 5, extends to the circuit-controller D. From the other spring of the current-reverser a wire, 6, extends to the mercury-cup $b$, and from the stationary electrodes of the cells A B wires 7 8 extend to the coils of the electro-magnets E E', Fig. 1, and from thence to the current-reverser G' and the mercury-cups $f f'$. A resistance, R', is placed in the shunt-circuit at any particular point common to both cells, to compensate for variations in the resistance of the cells in circuit, caused by changes in the temperature of the solution.

The operation is as follows, reference being had more especially to Fig. 1: If the reversers are in the position shown in Fig. 1 and the beam C is depressed at cell A and elevated at B, then the arm $e'$ of the circuit-controller D will be depressed, making contact with the mercury in cup $f'$, while arm $e$ will be elevated, breaking contact with mercury in $f$. The current in the shunt will then be from 2 on one side of R, by wire 4 through G, by wire 5 through D, cup $f'$, reverser G', electro-magnet E', wire 8, from stationary to suspended electrode of cell B, arm C, cup $b$, wire 6, resistance R', reverser G, and wire 3, to 2 on the other side of the resistance R. E' will attract $h$, causing it to work the register with one impulse, and there will be a deposit upon the elevated suspended electrode of B until its weight overcomes the weight of the depressed suspended electrode of A, when the beam C will be tipped, the movement being regulated by dash-pot $a$ and the electrical connection with C being maintained by the mercury-cup $b$. Now, the point of $e$ will be in the mercury of cup $f$, while the point of $e'$ will be raised out of the mercury of cup $f'$. The current will now flow from 2 by 4 G 5 D $f$ G', electro-magnet E 7, from stationary to suspended electrode of cells A C $b$ 6 R' G 3, back to 2. The electro-magnet E will now attract $h$, giving another movement to the register, while the deposit will be upon the elevated suspended electrode of A, which will finally overbalance the depressed suspended electrode of B, causing the beam C to tip again, and repeat the operation. In this operation the suspended electrodes act as the cathodes of the cells, and the meter works by depositing metal first upon one electrode and then upon the other. At the end of a month, or after any other lapse of time, the reversers G G' will be turned. The stationary electrodes will then become the cathodes of the cells, and metal will be stripped from each suspended electrode when in a depressed position, until it becomes lighter than the elevated electrode, when the beam will be tipped. The course of the current in that case will be explained in connection with Fig. 2, which shows the reversers shifted.

In Fig. 2 there is especially shown a modification of the connections of the electro-magnets E E', which operate the register. Instead of having those electro-magnets directly in the circuit of the meter, they may be in a multiple-arc circuit, 9 10 from 1 2, with additional resistance R², if required. In that case the circuit-controller D will operate an additional pair of arms, $i i'$, which will be insulated from the rest of the circuit-controller, and will carry points dipping in cups $k k'$. The wire 9 will run to the arms $i i'$, and from the mercury-cups $k k'$ the circuit will divide to the two electro-magnets, E E', from which the wire 10 will extend to the other main conductor. With this construction the wires 7 8 pass from the stationary electrodes of the cells directly to the current-reverser G', and do not connect with the coils of the electro-magnets E E'. Each time the current-controller D is moved by the movement of the beam C, the circuit of one of the electro-magnets E E' will be broken, and that of the other electro-magnet completed, thus working the register.

When the reversers are shifted to make the suspended electrodes the anodes of the cells, Fig. 2, the current will take the following course: Supposing the beam C to be depressed at cell A and the point carried by arm $e'$ to be immersed in the mercury of cup $f'$, from 2 on one side of R by wire 4 to G, from thence by wire 6, resistance R', to cup $b$, then by beam C to the suspended electrode of cell A, and from there to the stationary electrode of A, and by wire 7 to reverser G', cup $f'$, controller D, wire 5, reverser G, and wire 3, back to wire 2 on the other side of R. Metal will be stripped from the suspended electrode of A, when it will be overbalanced by the suspended electrode of B, causing the beam C to tip and the arm $c$ to make contact in $f$. Now, the current will be from 2 on one side of R, via 4 G 6 R' $b$ C, through cell B, from the suspended to the stationary electrode S G' $f$ D 5 G 3, to 2 on the other side of R. The suspended electrode of B will now be stripped until lighter than that of A, when the beam C will again be tipped and the operation repeated. The electro-magnets E E' will work the register at each movement of C, as before explained. This register will be worked by complete movements of the beam, but will not be affected by a partial movement, which it may be desirable to take account of. For this purpose a scale, S, is placed back of the arm or finger $c$, or is otherwise arranged in connection with the beam C, so that it will show partial movements of such beam.

Instead of using electro-magnets to operate the register, an arrangement operated mechanically by the movement of the beam C may be employed. A construction for the purpose is shown in Fig. 3, wherein an arm, H, projects downwardly from the pivoted circuit-controller D, and by its movement works the register; or the electro-magnets E E' may be employed to operate the register, and be worked by a local battery, the circuit of which will be made and broken by the movement of the beam; or a thermostatic device worked by the expansion of a rod or chamber may be used to operate the register, the circuit through this device being made and broken by the movement of the beam.

A local battery is shown in Fig. 4 as used in connection with a thermostatic device, although the thermostatic device may be connected with the light-circuit. The use of a local battery with the electro-magnets E E' will be readily understood. To effect the change from the arrangement shown in Fig. 2 it would be only necessary to disconnect the wire 9 10 from 1 2 and to connect 9 10 with the binding-posts of a galvanic battery, the extra resistance R² being omitted.

In Fig. 4, K is an expansible chamber inclosing a heating-resistance, L, which is shown as an incandescent electric lamp. F is the register connected with the chamber K, and operated by it. L B is a local battery in circuit with the resistance L, the circuit-controller D, and the mercury-cup $l$. When D is tipped in one direction, the circuit of the local battery is closed and the resistance heated, expanding the chamber and moving the register-arm in one direction. The tipping of D in the other direction breaks the circuit, allowing the resistance to cool and the chamber to contract, moving the register-arm in the other direction. A spring or weight operated mechanism could be used to work the register, it being released and locked by the movement of the beam. This is illustrated in Fig. 5, wherein a pivoted tipping device, D', worked by the arm $c$ from the beam, acts to lock and release a scape-wheel of a weight or spring operated train, M, forming part of the register. An incandescing electric lamp or other form of heating-resistance the circuit of which is closed by a thermostatic device is used in connection with the meter to prevent the solution of the cells from freezing, as shown in my Patent No. 251,558.

In connection with each automatic meter there is preferably used a simple electrolytic meter, I, placed with compensating-resistance $r$ in a shunt-circuit, 11 12, around a resistance, $r'$, in one of the main conductors of the house-circuit. This extra cell furnishes an accurate and reliable means of calculating the consumption, and its plates may be weighed if the automatic meter gets out of order, or as a check upon its accuracy. The automatic meter hereinbefore described differs essentially from that set forth in my Patent No. 240,678, in that in the meter of said patent the movement is produced by taking metal from one and adding metal to the other of two counterbalancing electrodes simultaneously, the current being reversed at each movement, while in the meter hereinbefore described the movement is produced by first adding metal to one and then adding it to the other of two counterbalancing electrodes, or first taking metal from one and then from the other of two counterbalancing electrodes, the current being reversed periodically by hand-reversers. The counterbalancing electrodes are thus both of the same nature, being both cathodes or anodes, and never one an anode and the other a cathode. The use of a complicated automatic current-reverser is thereby avoided, and the meter made more simple, efficient, and less liable to get out of order.

What I claim is—

1. An electrical meter having in combination two electro-depositing cells, and means for passing current through the cells alternately, substantially as set forth.

2. In an electrical meter, the combination of two electro-depositing cells, a pivoted beam from which one electrode of each cell is suspended, means for completing the circuit through the cells alternately, and a registering mechanism, substantially as set forth.

3. In an electrical meter, the combination of two electro-depositing cells, a pivoted beam from which one electrode of each cell is suspended, means for completing the circuit through the cells alternately, and reversers for periodically changing the relation of the electrodes of the cells, substantially as set forth.

4. In an electrical meter, the combination, with a pivoted beam, means operated by the current for oscillating said beam, and a registering apparatus moved by such oscillations, of a dash-pot for retarding the movement of the beam, substantially as set forth.

5. In an electrical meter, the combination, with two electro-depositing cells, of a pivoted beam from which one electrode of each cell is suspended, means for completing circuit through the cells alternately, a registering mechanism, and a movement-retarding device, substantially as set forth.

6. In an electrical meter, the combination, with the oscillating beam, of means operated by the current for oscillating such beam, a dash-pot for retarding the movement of the beam, and a mercury-cup for maintaining electrical connection with such beam, substantially as set forth.

7. In an electrical meter, the combination, with two electro-depositing cells, of a pivoted beam carrying an electrode of each cell, a pivoted circuit-controller worked by the movement of the beam and making and breaking circuits at mercury contacts, and having connections for completing circuit through the cells alternately, and a registering mechanism, substantially as set forth.

8. In an electrical meter, the combination, with two electro-depositing cells, of a working-beam from which one electrode of each cell is suspended, a circuit-controlling device for completing circuit through the cells alternately, and two current-reversers, one for reversing the connections of the meter with the main circuit and the other for reversing the connections within the meter between the circuit-controller and the cells, substantially as set forth.

This specification signed and witnessed this 24th day of June, 1882.

THOS. A. EDISON.

Witnesses:
RICHD. N. DYER,
EDWARD H. PYATT.